(12) United States Patent
Dagley et al.

(10) Patent No.: US 6,522,824 B2
(45) Date of Patent: Feb. 18, 2003

(54) CORNER WALL-MOUNT FIBER OPTIC CONNECTOR HOUSING

(75) Inventors: Mark R. Dagley, Ft. Worth, TX (US); Arden E. Stokes, Flower Mound, TX (US)

(73) Assignee: Corning Cable Systems LLC, Hickory, NC (US)

( * ) Notice: Subject to any disclaimer, the term of this patent is extended or adjusted under 35 U.S.C. 154(b) by 112 days.

(21) Appl. No.: 09/817,561

(22) Filed: Mar. 26, 2001

(65) Prior Publication Data

US 2002/0136521 A1 Sep. 26, 2002

(51) Int. Cl.[7] .............................. G02B 6/00; G02B 6/46
(52) U.S. Cl. ...................... 385/134; 385/135; 385/139
(58) Field of Search ................................ 385/134–137, 385/139

(56) References Cited

U.S. PATENT DOCUMENTS

| | | | | |
|---|---|---|---|---|
| 4,717,231 A | * | 1/1988 | Dewez et al. ................ | 385/135 |
| 4,911,510 A | * | 3/1990 | Jenkins ........................ | 385/136 |
| 5,013,112 A | * | 5/1991 | Hellwig ....................... | 385/147 |
| 5,430,823 A | * | 7/1995 | Dupont et al. .............. | 385/135 |
| 5,774,617 A | * | 6/1998 | Stockman et al. .......... | 385/134 |
| 5,917,982 A | * | 6/1999 | Vargas et al. ............... | 385/134 |
| 5,995,699 A | * | 11/1999 | Vargas et al. ............... | 385/134 |
| 6,201,920 B1 | * | 3/2001 | Noble et al. ................ | 385/134 |

FOREIGN PATENT DOCUMENTS

JP       61223803 A   * 10/1986   ............ G02B/6/00

* cited by examiner

*Primary Examiner*—Robert H. Kim
*Assistant Examiner*—Krystyna Suchecki
(74) *Attorney, Agent, or Firm*—Christopher C. Dremann

(57) ABSTRACT

A corner wall-mount fiber optic connector housing includes an enclosure having a back plate for mounting in a corner between two walls. The enclosure is provided with at least one provider port for entry of a fiber optic provider cable having a plurality of optical fibers and at least two customer ports for entry of a fiber optic customer cable having a plurality of optical fibers. At least two fiber optic connector panel mounts located within the enclosure have an aperture for receiving a plurality of connectors to optically interconnect the fibers of the provider cable with the fibers of the customer cable. The back plate is formed in two planes at an angle to each other for mounting in the corner, and one of the customer ports and one of the connector panel mounts is positioned adjacent a respective one of the two planes of the back plate.

10 Claims, 6 Drawing Sheets

CORNER WALL-MOUNT FIBER OPTIC CONNECTOR HOUSING

BACKGROUND OF THE INVENTION

1. Field of the Invention

This invention relates in general to telecommunications equipment housings, and more particularly, to a housing for containing fiber optic connections that is adapted to be mounted in a corner between two walls.

2. Description of the Related Art

Fiber optic cables are used for transmitting voice, data and video communications. In a typical installation, a provider cable will extend to a connector in a housing mounted to a wall at the user's facility. The provider cable usually includes a bundle of individual optical fibers, each fiber transmitting optical signals. The provider cable passes through a provider port in the housing and connectors on the ends of the fibers connect to adapters on a connector panel. The connector panel has a plurality of apertures, one for each connector/adapter pair. A customer cable including one or more optical fibers is routed from various equipment in the customer's facility to the housing through a customer port and optically connects with the optical fibers of the provider cable at the connector panel.

Many different types of wall mounted housings exist. These are commonly designed as rectangular boxes having provider cable connections on one side and customer cable connections on the other side, which protrude from the mounting wall a minimal distance to render them unobtrusive and to occupy minimal space. Such housings are often mounted in the vicinity of the customer's equipment below the work area so that only a short customer cable is required to connect the equipment to the housing. In this manner, both the housing and the customer cable remain out of sight beneath the work area.

Although conventional housings are suitable for mounting against a wall in this manner, it is often desirable to mount a housing in a corner between two walls. Accordingly, a provider cable can be routed vertically along the corner and into the housing from above or below. Also, customer cables can be conveniently routed from the housing along both walls to different customer equipment located adjacent the walls. When conventional housings are mounted in a corner, they tend to occupy more wall space on one side of the corner than on the other, due to their rectangular design. This asymmetry can lead to problems when trying to arrange furniture adjacent the corner. For example, a desk may have to be displaced from the corner by as much as the depth or the width of the housing if it is to be positioned flush against one of the walls. In addition, if the customer cable emerges from the housing in the same plane that the provider cable enters the housing, the customer cable may have to be routed around a ninety degree (90°) corner immediately after emerging from the housing, leading to possible transmission losses due to bending. Furthermore, when mounted in a corner between two walls, the housing is less likely to be unintentionally struck and damaged by the user, the desk, or the customer equipment than when mounted in directly under a desk on a wall.

BRIEF SUMMARY OF THE INVENTION

According to the present invention, a corner wall-mount fiber optic connector housing includes an enclosure having a back plate for mounting against a wall. At least one provider port is provided in the enclosure for the entry of a fiber optic provider cable having a plurality of optical fibers. At least two customer ports are provided in the enclosure for the entry of fiber optic customer cables having a plurality of optical fibers. At least two fiber optic connector panel mounts are positioned within the enclosure, each having an opening for receiving optical connectors to optically interconnect the fibers of the provider cable with the fibers of the customer cables.

The back plate is formed in two planes positioned at an angle to each other for mounting the housing in a corner between two walls. One of the customer ports and one of the connector panels is mounted adjacent each of the two planes of the back plate. Mounting the connector panels adjacent the two planes of the back plate permits the housing to be made symmetrical about the apex of the back plate. The preferred design enables the depth and the width of the enclosure to be minimized in both planes of the back plate, thereby ensuring that the housing may be mounted snugly in a corner between two walls while occupying a minimal amount of space on either wall. Furthermore, the provision of at least one customer port and one connector panel adjacent each plane of the back plate, and hence adjacent the walls forming the corner in which the housing is mounted, enables a customer cable to be routed directly from the housing parallel to the wall along which it is routed, thereby removing at least one bend from the customer cable.

Preferably, the two planes of the back plate are angled approximately ninety degrees (90°) apart. In this manner, the housing is optimised for corner installations between standard right angle walls. The connector panels preferably divide the enclosure into at least one provider compartment on the provider cable side of the connector panels and at least one customer compartment on the customer cable side of the connector panels. The at least one provider port permits entry/exit of the provider cable into the at least one provider compartment, and the at least two customer ports permit entry/exit of the customer cable into the at least one customer compartment. In this manner, the provider cable and its optical fibers and optical connectors may be kept separate from the customer cable and its optical fibers and connectors, thereby ensuring orderly management of the optical fibers and connectors on the respective sides of the connector panels.

The enclosure further includes top and bottom walls and a front panel having a first door to permit access to the at least one customer compartment. Preferably, the connector panels are in juxtaposition with and substantially orthogonal to the back plate and the top and bottom walls to form the at least two customer compartments. At least two customer ports are located on the top and bottom walls for routing a customer cable into the customer compartments. Customer compartments are thus located at either side of the provider compartment. In this way, two customer compartments and customer ports are located adjacent respective walls when mounted in a corner, thereby enabling separate customer cables to be conveniently connected to opposite sides of the housing. This arrangement may be particularly advantageous for simultaneously connecting customer equipment located along each of the two walls.

Advantageously, the front panel further includes a second door to permit access to the at least one provider compartment. In this manner, the customer compartments can be accessed while the provider compartment remains closed, thereby reducing the risk of confusion between the customer cable connections and the provider cable connections. Preferably, the second door is fitted with a lock to prevent unauthorized access to the provider compartment. Thus, the provider is afforded the security of knowing that the customer cannot gain access to the provider compartment, while at the same time, the customer remains able to access the customer compartments to reconfigure the optical connections as desired.

DETAILED DESCRIPTION OF THE INVENTION

Figure 5:
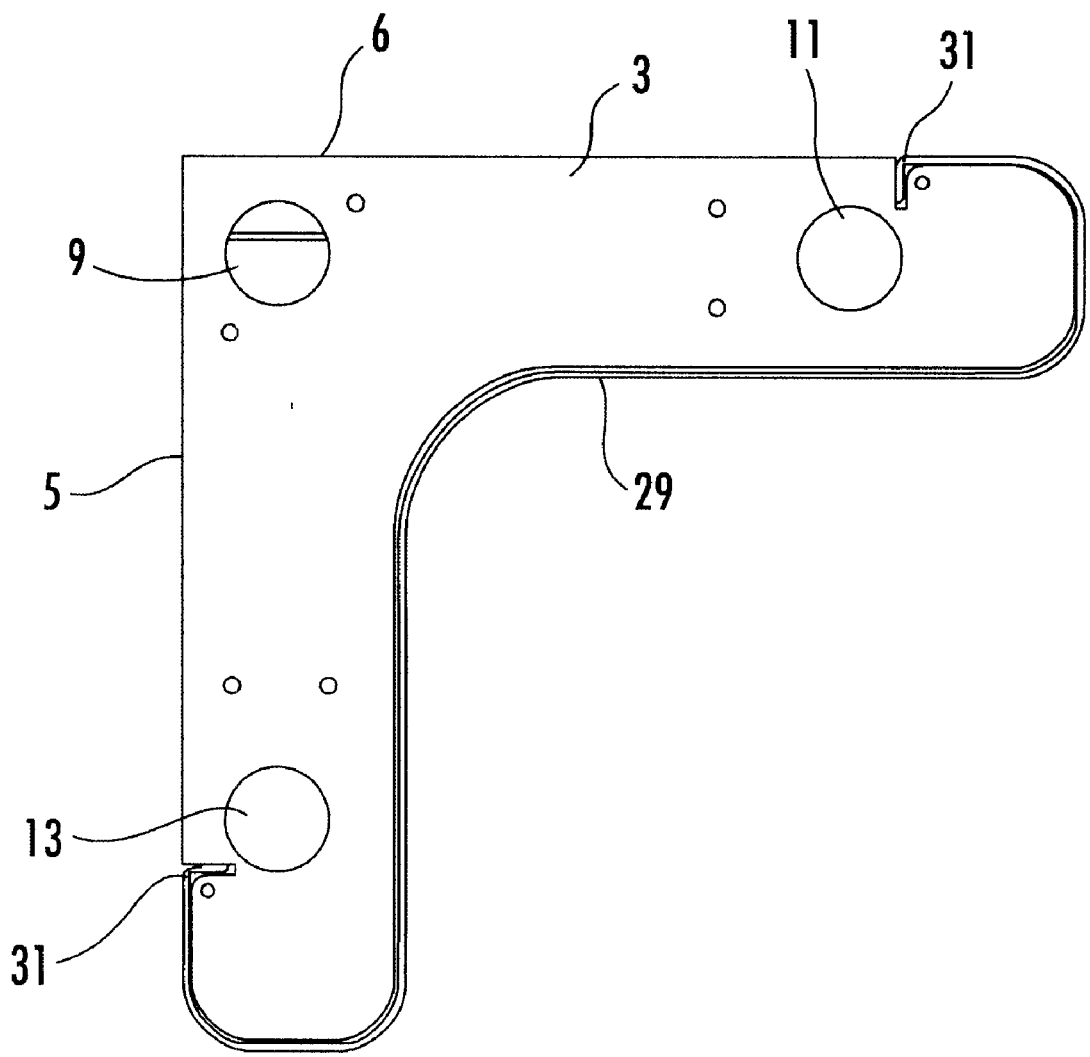
FIG. 5 is a top plan view of the corner wall-mount fiber optic connector housing of FIG. 1.
Figure 6:
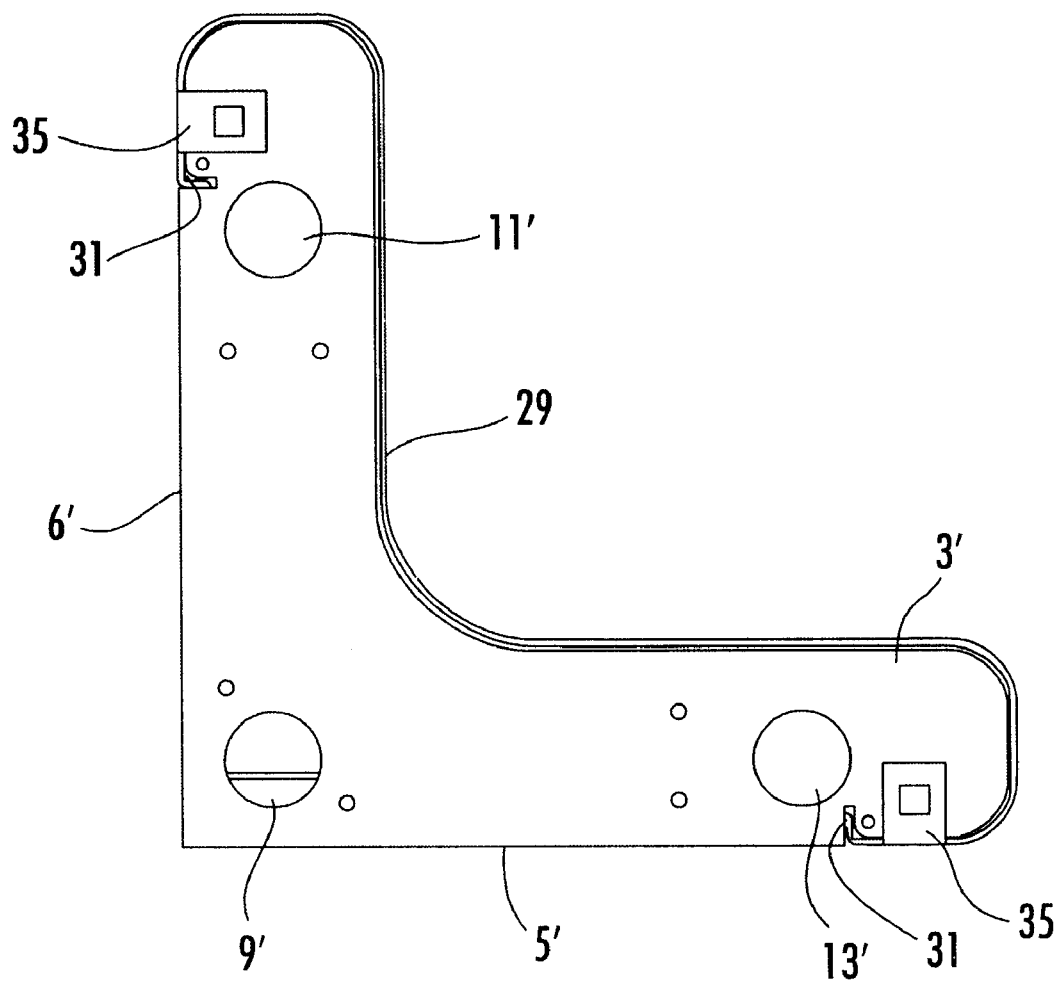
FIG. 6 is a bottom plan view of the corner wall-mount fiber optic connector housing of FIG. 1.

Referring now to the figures, the corner wall-mount fiber optic connector housing 1 comprises an enclosure having top and bottom walls formed by 'L-shaped' parallel plates 3 and 3' respectively (FIGS. 5 and 6). The top and bottom plates 3, 3' have right angle back edges 5, 6, 5', 6', short side edges 4, 4', and rounded front edges 8, 8' that are partly parallel to the back edges. The back edges 5, 6, 5', 6' of the top and bottom plates 3, 3' are joined by a back plate 7 formed in two planes. The two planes of the back plate 7 are angled at approximately ninety degrees (90°) to each other and correspond to the right angle back edges 5, 6, 5', 6'. Preferably, the back plate 7 does not quite reach as far as the side edges 4, 4'. Each of the top and bottom plates 3, 3' is provided with provider ports 9, 9' at their apexes and customer ports 11, 11' and 13, 13' towards each extremity. The ports 9, 9', 11, 11', 13, 13' may be provided with conventional strain relief devices (not shown) in a known manner.

Figure 1:
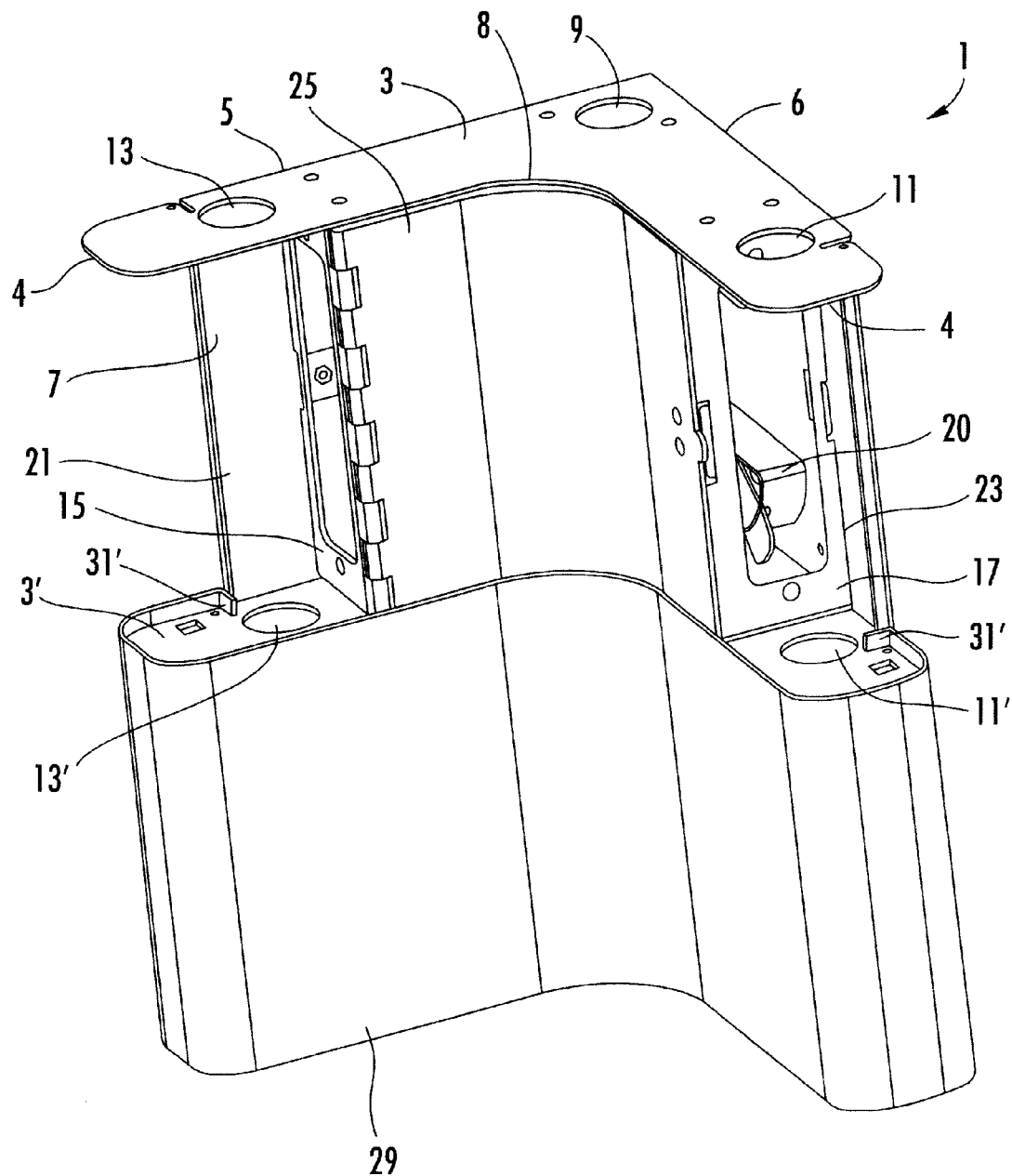
FIG. 1 is a perspective view of a corner wall-mount fiber optic connector housing according to the invention shown with the outer door open.
Figure 2:
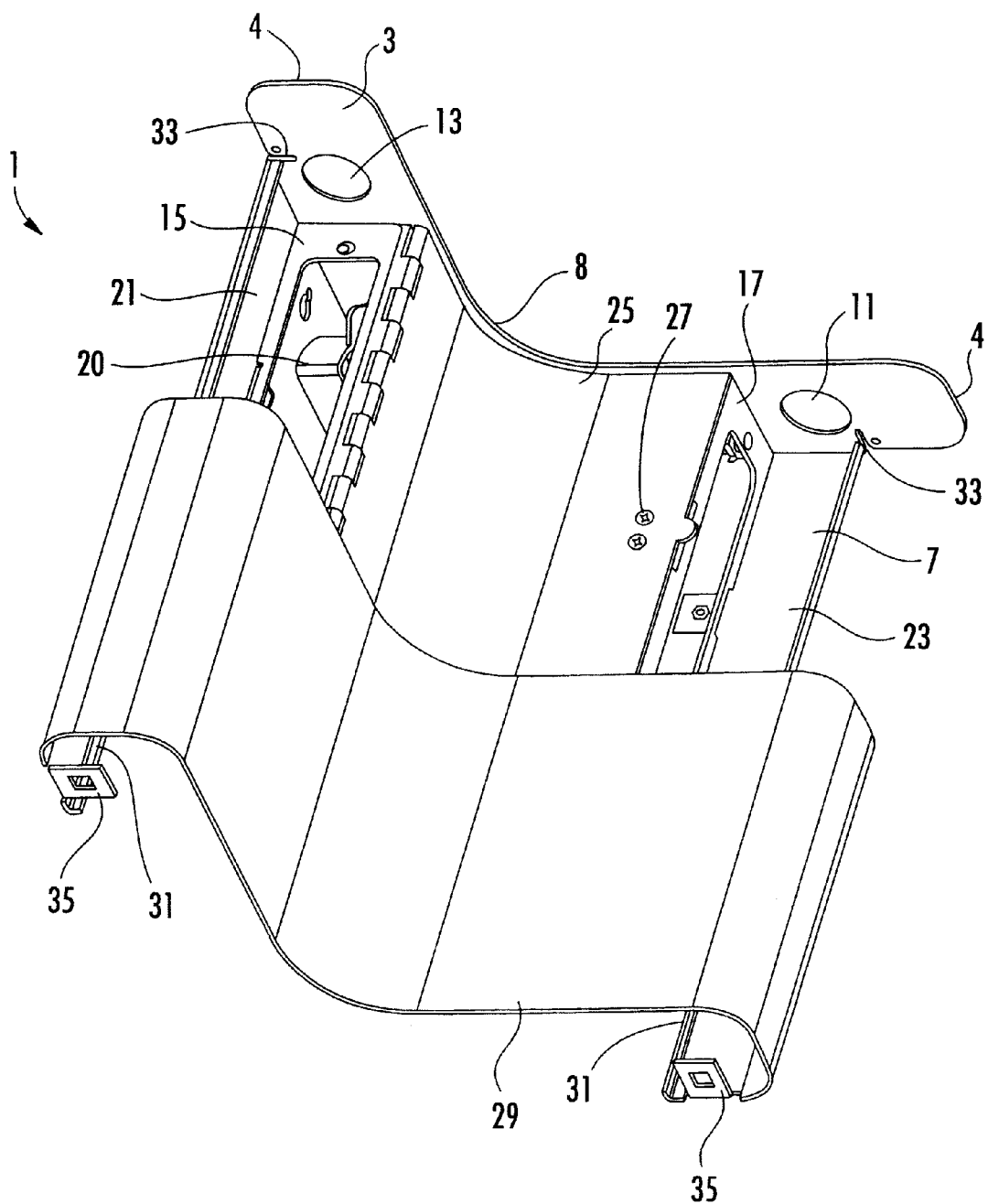
FIG. 2 is a perspective view of the corner wall-mount fiber optic connector housing of FIG. 1 from a different angle.
Figure 3:
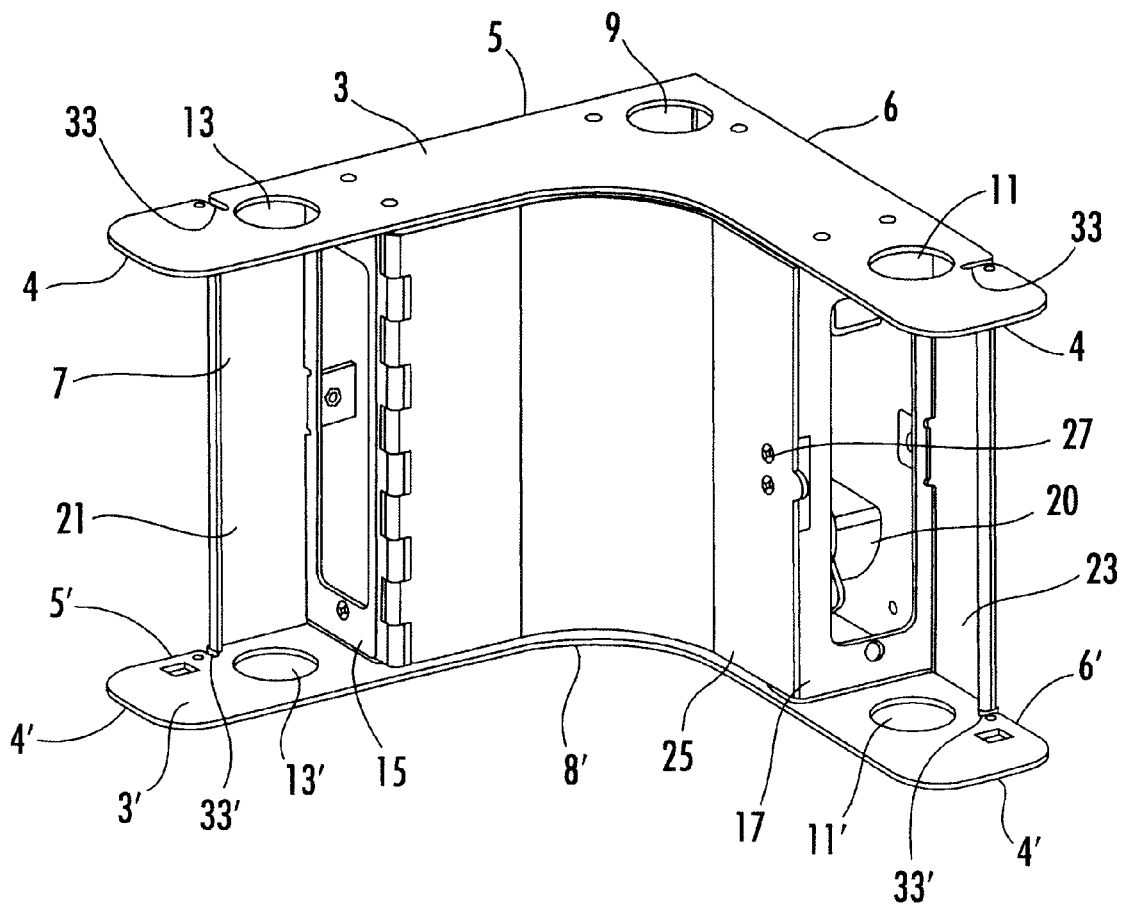
FIG. 3 is a perspective view of the corner wall-mount fiber optic connector housing of FIG. 1 shown with the outer door removed.
Figure 4:
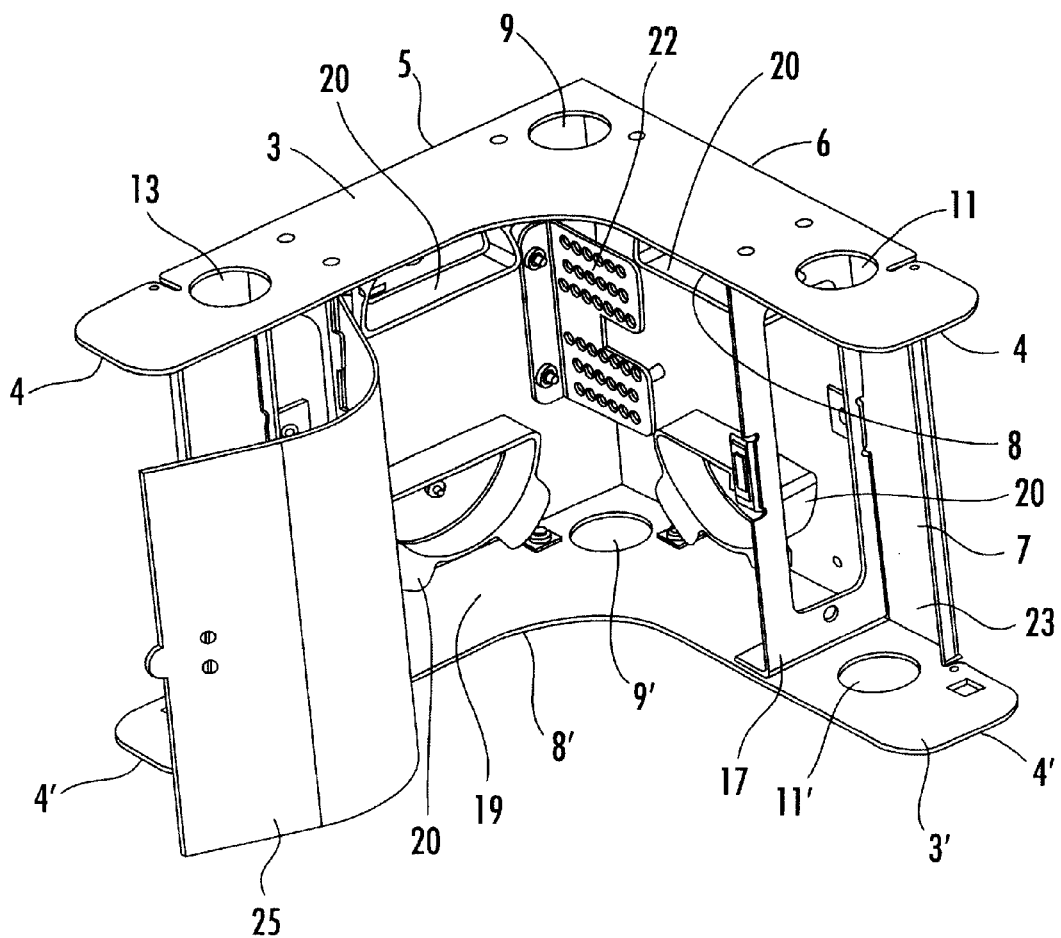
FIG. 4 is a perspective view of the corner wall-mount fiber optic connector housing of FIG. 1 shown with the inner door open.

Two fiber optic connector panel mounts 15, 17 extend between the top and bottom plates 3, 3'. As shown, connector panel mount 15 is located between customer ports 13, 13' and provider ports 9, 9', and connector panel mount 17 is located between customer ports 11, 11' and provider ports 9, 9'. The connector panel mounts 15, 17 are orthogonal to the back plate 7 and to the top and bottom plates 3, 3'. As such, the connector panel mounts 15, 17 divide the cavity defined by the enclosure into a middle provider compartment 19 and two opposed outer customer compartments 21, 23 (FIGS. 3 and 4). Preferably, each connector panel mount 15, 17 comprises a plate having a large central opening for mounting a fiber optic connector panel, preferably of the type having apertures for mounting a plurality of fiber optic connectors. Within the provider compartment 19, there are suitably located two fiber routing/storage devices 20, one attached to each plane of the back plate 7, and a strain relief bracket 22 adjacent the provider ports 9, 9'.

As shown, an inner door 25 is hinged along one edge to the connector panel mount 15. Alternatively, inner door 25 may be hinged to connector panel mount 17. The inner door 25 has an L-shape curvature that corresponds to the curvature of the front edges 8, 8' of the top and bottom plates 3, 3'. Thus, when closed, the inner door 25 lies flush with the front edges 8, 8' and extends to connector panel mount 17. Inner door 25 thereby serves to close the provider compartment 19 opposite the back plate 7. A lock 27 may be fitted to the end of the inner door 25 remote from the hinge on connector panel mount 15 to enable the inner door 25 to be locked to the connector panel mount 17.

An outer door 29 comprises a plate having a shape and size which conforms to the shape and size of the front edges 8, 8', sides 4, 4' and part of the back edges 5, 6, 5', 6' of the enclosure. Running along the lengths of both sides, the outer door 29 has turned-in lips 31 which align with slits 33, 33' cut into the back edges 5, 6, 5', 6' of the top and bottom plates 3, 3'. At their upper ends, the lips are formed with extensions 31' that are longer than the slits 33' in the bottom plate 3', and thus, prevent the outer door 29 from falling off the enclosure when the outer door 29 is in the open position. Two perpendicular tabs 35 with locking screw holes are provided at the lower edges of the outer door 29 close to the lips 31. When closed, the outer door 29 wraps around the front, sides and part of the back of the enclosure with the lips 31 located within slits 33, 33' and tabs 35 located against the lower surface of the bottom plate 3'. In this position, the outer door 29 lies over and conceals the closed inner door 25 and, at the same time, closes the customer compartments 21, 23. Locking screw holes (not shown) in the lower plate 3' are aligned with the locking screw holes in the tabs 35 to permit ¼-turn locking screws to be inserted to secure the outer door 29 in the closed position.

In use, the corner wall-mount fiber optic connector housing 1 is mounted with the two planes of the back plate 7 against two adjacent walls forming a corner, and preferably, a right angle corner. In this manner, the housing 1 fits tightly into the corner with its L-shaped design occupying minimal wall space and minimal volume between the walls. Because of its compact and lightweight design, the housing 1 may be installed in corners formed by either solid or temporary partitions, or behind or under a desk positioned in the corner, without requiring significant displacement of the desk. With the inner door 25 and the outer door 29 open, a fiber optic provider cable (not shown) is routed along the corner to the housing 1 from above or below and into the enclosure via one of the provider ports 9, 9', respectively. A further provider cable may be routed into the enclosure from the other direction via the second of the provider ports 9, 9'. Alternatively, a branch of the provider cable may be routed into the enclosure through one of the provider ports 9, 9' and out of the enclosure via the other provider port 9, 9' to be routed into another housing 1, or to other customer equipment.

The provider cable is routed behind or in front of the strain relief bracket 22. Cable ties are passed through appropriate holes in the strain relief bracket 22 and wrapped around the cable sheath to hold it securely and thereby prevent transmission of strain from the provider cable to the individual optical fibers. Optical fibers from the provider cable are terminated with optical connectors that are inserted into adapters in appropriate positions on the connector panel mounts 15, 17. Excess slack from the optical fibers of the provider cable is wrapped around the fiber routing/storage devices 20. Once the provider cable is secured to the strain relief bracket 22 and the optical fibers have been connected, the inner door 25 may be closed and locked to avoid confusion between provider and customer optical fibers and to prevent subsequent unauthorized access to the provider compartment 19.

Fiber optic customer cables (not shown) may then be routed into the enclosure via the customer ports 11, 11', 13, 13', as appropriate. Because two of the customer ports 11, 11', 13, 13' are located adjacent each wall, it is convenient to use the connector port(s) nearest to the customer equipment to which the customer cable is attached. Thus, it will be appropriate for a customer cable leading from customer equipment located along one wall to be routed into one of the connector ports 11, 11', 13, 13' of the enclosure located adjacent that wall. In this manner, it is not necessary for the customer cable to be routed around the corner before entering the enclosure. The ends of the optical fibers of the customer cable are terminated with optical connectors and plugged into respective adaptors on the connector panel mounts 15, 17. Once all the connections have been made, the outer door 29 is slid upwards until the inner door 25 is concealed and the tabs 35 are located against the lower surface of the bottom plate 3'. Thereafter, the ¼-turn locking screws are inserted through the tabs 35 to hold the outer door 29 in the closed position.

Should it be required to change the customer connections at any time, for example due to reconfiguration of the customer equipment, office furniture, or office space, the customer may gain access to the customer compartments 21, 23 by simply sliding the outer door 29 to the open position. Any changes to the customer connections can then be made without interfering with the connections in the provider compartment 19, access to which remains barred by the locked inner door 25.

The invention is described herein with reference to the accompanying figures by way of example only. It will be immediately apparent to those of ordinary skill in the art that the invention is susceptible to further modifications not described herein. For example, although for the purposes of the example illustrated by the FIGS. 1–6, the customer ports 11, 11', 13, 13' are located in the top and bottom plates 3, 3', they may instead be formed by slots in the sides of the outer door 29 to enable the customer cables to exit the enclosure in a horizontal orientation. This arrangement may further reduce the number of bends in the customer cable by enabling the customer cable to be routed from the housing 1 along the wall without bends in such instances where the customer equipment to be connected to the provider cable is not located in the immediate vicinity of the corner. According to another modification, the enclosure could be formed in two parts which are rotatable relative to one another about the apex of the back plate 7, thereby enabling the housing 1 to accommodate corners of greater or less than 90°. In this case, further modifications would need to be made to the inner door 25 and the outer door 29.

That which is claimed is:

1. A fiber optic connector housing comprising:
    an enclosure having a back plate for mounting against a wall;
    at least one provider port in the enclosure for receiving a fiber optic provider cable having a plurality of optical fibers;
    at least two customer ports in the enclosure for receiving a fiber optic customer cable having a plurality of optical fibers; and
    at least two fiber optic connector panel mounts located within the enclosure, each having an aperture for mounting a connector to optically interconnect the fibers of the provider cable with the fibers of the customer cable;
    wherein the back plate is formed in two planes at an angle to each other for mounting the housing in a corner between two walls; and
    wherein each customer port and each connector panel is located adjacent a respective one of the two planes of the back plate.

2. A fiber optic connector housing according to claim 1, wherein the two planes of the back plate are at an angle of approximately ninety degrees (90°).

3. A fiber optic connector housing according to claim 1, wherein:
    the connector panels divide the enclosure into at least one provider compartment on the side of the connector panels adjacent the provider port and at least two customer compartments on the side of the connector panels adjacent the customer ports;
    the provider port permits entry of the provider cable into the provider compartment; and
    the customer ports permit entry of the customer cable into the customer compartments.

4. A fiber optic connector housing according to claim 3, wherein:
    the enclosure further comprises top and bottom walls; and
    the provider port and the customer ports are located in at least one of the top and the bottom walls.

5. A fiber optic connector housing according to claim 3, wherein the enclosure further comprises a first door to permit access to the customer compartments.

6. A fiber optic connector housing according to claim 5, wherein:
    the connector panels are in juxtaposition with and substantially orthogonal to the back plate and to each of the top and bottom walls to form the customer compartments; and
    each of the customer ports is located adjacent one of the connector panels.

7. A fiber optic connector housing according to claim 5, wherein the enclosure further comprises a second door to permit access to the provider compartment.

8. A fiber optic connector housing according to claim 7, wherein the first door is mounted for sliding movement relative to the second door.

9. A fiber optic connector housing according to claim 7, wherein the second door is hinged to the enclosure.

10. A fiber optic connector housing according to claim 9, wherein the second door is provided with a lock to prevent unauthorized access to the provider compartment.

* * * * *